(12) United States Patent
Aflaki Beni

(10) Patent No.: US 11,252,451 B2
(45) Date of Patent: Feb. 15, 2022

(54) METHODS AND APPARATUSES RELATING TO THE HANDLING OF A PLURALITY OF CONTENT STREAMS

(71) Applicant: Nokia Technologies Oy, Espoo (FI)

(72) Inventor: Payman Aflaki Beni, Tampere (FI)

(73) Assignee: NOKIA TECHNOLOGIES OY, Espoo (FI)

(*) Notice: Subject to any disclaimer, the term of this patent is extended or adjusted under 35 U.S.C. 154(b) by 460 days.

(21) Appl. No.: 16/060,563

(22) PCT Filed: Nov. 21, 2016

(86) PCT No.: PCT/FI2016/050816
§ 371 (c)(1),
(2) Date: Jun. 8, 2018

(87) PCT Pub. No.: WO2017/109274
PCT Pub. Date: Jun. 29, 2017

(65) Prior Publication Data
US 2020/0169764 A1    May 28, 2020

(30) Foreign Application Priority Data
Dec. 23, 2015  (GB) .................................... 1522822

(51) Int. Cl.
*H04N 21/23*     (2011.01)
*H04N 21/2343*   (2011.01)
(Continued)

(52) U.S. Cl.
CPC ....... *H04N 21/2343* (2013.01); *H04N 13/189* (2018.05); *H04N 13/194* (2018.05);
(Continued)

(58) Field of Classification Search
USPC .................................................... 375/240.26
See application file for complete search history.

(56) References Cited

U.S. PATENT DOCUMENTS 6,678,323 B2  1/2004  Tam et al.
7,075,567 B2  7/2006  Hunter et al.
(Continued)

FOREIGN PATENT DOCUMENTS

CN    101867816 A    10/2010
GB    2264838 A      9/1993
WO    2010/116171 A1 10/2010

OTHER PUBLICATIONS

Wheatstone, "Contributions to the Physiology of Vision.—Part the First. On Some Remarkable, and Hitherto Unobserved Phenomena of Binocular Vision", Philosophical Transactions of the Royal Society, vol. 128, Jan. 1, 1838, pp. 371-394.
(Continued)

*Primary Examiner* — Behrooz M Senfi
(74) *Attorney, Agent, or Firm* — Alston & Bird LLP

(57) ABSTRACT

This specification describes a method comprising selecting at least one content stream from a plurality of content streams based on at least one detected characteristic associated with the content streams or an intended viewer of the content streams, wherein each content stream is captured by a corresponding recording device and at least one of the plurality of content streams is not selected, and compressing data representing the at least one selected content stream such that the content of the at least one selected content stream has a lower quality compared to the content of the at least one non-selected content stream.

20 Claims, 5 Drawing Sheets

(51) Int. Cl.

| | |
|---|---|
| *H04N 19/597* | (2014.01) |
| *H04N 13/189* | (2018.01) |
| *H04N 13/194* | (2018.01) |
| *H04N 13/243* | (2018.01) |
| *H04N 21/218* | (2011.01) |
| *H04N 13/20* | (2018.01) |

(52) U.S. Cl.
CPC .......... *H04N 13/20* (2018.05); *H04N 13/243* (2018.05); *H04N 19/597* (2014.11); *H04N 21/21805* (2013.01)

(56) References Cited

U.S. PATENT DOCUMENTS

| | | | |
|---|---|---|---|
| 8,068,154 B2 | 11/2011 | Jacob et al. | |
| 2003/0236906 A1* | 12/2003 | Klemets ......... | H04N 21/440281 709/231 |
| 2004/0246333 A1* | 12/2004 | Steuart, III ........... | G03B 35/08 348/36 |
| 2007/0024705 A1* | 2/2007 | Richter ............. | H04N 7/17318 348/142 |
| 2007/0024706 A1* | 2/2007 | Brannon, Jr. ...... | H04N 21/4223 348/142 |
| 2008/0198920 A1* | 8/2008 | Yang .................... | H04N 13/122 375/240.01 |
| 2008/0316301 A1* | 12/2008 | Givon .................... | G03B 35/00 348/49 |
| 2011/0280316 A1 | 11/2011 | Chen et al. | |
| 2012/0098928 A1* | 4/2012 | Yun ..................... | H04N 19/597 348/43 |
| 2013/0250121 A1* | 9/2013 | Piran ................... | H04L 65/4084 348/159 |
| 2014/0098195 A1* | 4/2014 | Pace ...................... | H04N 13/25 348/47 |
| 2015/0058102 A1 | 2/2015 | Christensen et al. | |
| 2015/0128174 A1* | 5/2015 | Rango .............. | H04N 21/21805 725/34 |
| 2015/0288945 A1 | 10/2015 | Nisenzon | |
| 2015/0346812 A1* | 12/2015 | Cole ....................... | G06F 3/017 345/156 |
| 2015/0346832 A1* | 12/2015 | Cole ................... | H04L 65/4069 345/156 |
| 2016/0381110 A1* | 12/2016 | Barnett ................. | H04L 65/601 709/231 |

OTHER PUBLICATIONS

"Methodology for the Subjective Assessment of the Quality of Television Pictures", Recommendation ITU-R BT.500-11, 2002, 48 pages.
Gorley et al., "Stereoscopic Image Quality Metrics and Compression", SPIE Proceedings: Stereoscopic Displays and Applications XIX, vol. 6803, 2008, 12 pages.
Chikkerur et al., "Objective Video Quality Assessment Methods: A Classification, Review, and Performance Comparison", IEEE Transactions on Broadcasting, vol. 57, No. 2, Jun. 2011, pp. 165-182.
"User Requirements for Objective Perceptual Video Quality Measurements in Digital Cable Television", Series J: Transmission of Television, Sound Programme and Other Multimedia Signals, Measurement of the Quality of Service ITU-T J.143, May 2000, 15 pages.
"Subjective Video Quality Assessment Methods for Multimedia Applications", Series P: Telephone Transmission Quality, Telephone Installations, Local Line Networks, Audiovisual Quality in Multimedia Services, ITU-T P.910, Sep. 1999, 37 pages.
Cook et al., "Distributed Ray Tracing", Computer Graphics, vol. 18, No. 3, Jul. 1984, pp. 137-145.
Gopinathan et al., "Design Considerations for High-Frequency Continuous-Time Filters and Implementation of an Antialiasing Filter for Digital Video", IEEE Journal of Solid-State Circuits, vol. 25, No. 6, Dec. 1990, pp. 1368-1378.
Aflaki, "Compression and Subjective Quality Assessment of 3D Video", Thesis, vol. 1174, 2013, 183 pages.
Cho et al., "Fast Motion Deblurring", ACM Transactions on Graphics, vol. 28, No. 5, Dec. 2009, pp. 1-8.
Choi et al., "Fast Motion Estimation with Modified Diamond Search for Variable Motion Block Sizes", International Conference on Image Processing, vol. 2, Sep. 14-17, 2003, pp. 371-374.
"Joint Call for Proposals on Video Compression Technology", ITU—Telecommunications Standardization, Document VCEG-AM91, ITU-T Q6/16 Visual Coding, Jan. 17-22, 2010, 19 pages.
Azimi et al., "Subjective Study on Asymmetric Stereoscopic Video with Low-pass Filtered Slices", International Conference on Computing, Networking and Communications (ICNC), Jan. 30-Feb. 2, 2012, pp. 719-723.
Tam et al., "Stereoscopic Video: Asymmetrical Coding with Temporal Interleaving", Stereoscopic Displays and Virtual Reality Systems VIII, vol. 4297, Jun. 22, 2001, pp. 299-306.
Search Report received for corresponding United Kingdom Patent Application No. 1522822.4, dated Jun. 14, 2016, 7 pages.
International Search Report and Written Opinion received for corresponding Patent Cooperation Treaty Application No. PCT/FI2016/050816, dated Feb. 16, 2017, 16 pages.
Aflaki et al., "Subjective Quality Assessment of Asymmetric Stereoscopic 3D Video", Signal, Image and Video Processing, vol. 9, No. 2, Feb. 2015, pp. 331-345.
Office action received for corresponding European Patent Application No. 16877845.4, dated Jan. 16, 2020, 5 pages.
Extended European Search Report received for corresponding European Patent Application No. 16877845.4, dated May 6, 2019, 8 pages.
Liu et al., "Asymmetric Stereoscopic Video Encoding Algorithm based on Subjective Visual Characteristic", International Conference on Wireless Communications & Signal Processing, Nov. 13-15, 2009, 5 pages.
Kalva et al., "Design and Evaluation of a 3D Video System Based on H.264 View Coding", Proceedings of the 2006 International workshop on Network and operating systems support for digital audio and video, Nov. 22-23, 2006, 6 pages.
Oral Proceedings received for corresponding European Patent Application No. 16877845.4, dated Aug. 19, 2020, 7 pages.
Decision to Refuse a European Patent Application for European Application No. 16877845.4 dated Feb. 24, 2021, 14 pages.
Julesz, B., "Foundations of Cyclopean Perception", University of Chicago Press (1971), 11 pages.
Legrand, Y., "Form and Space Vision" (Millodot et al, Trans.), Indiana University Press (1967), 374 pages.
Minutes of the Oral Proceedings for European Application No. 16877845.4 dated Feb. 23, 2021, 8 pages.
Mitsuhashi, T., "Subjective Image Position in Stereoscopic TV Systems: Considerations on Comfortable Stereoscopic Images", Human Vision, Visual Processing and Digital Display V. 2179, (May 1, 1994), pp. 259-266.
Perkins, M., "Data Compression of Stereopairs", IEEE Transactions on Communications, vol. 40, No. 4 (Apr. 1992), pp. 684-696.
Stelmach et al., "Bandwidth Reduction for Stereoscopic Video Signals", Stereoscopics Displays and Virtual Reality Systems VII, vol. 3957 (May 3, 2000) pp. 33-40.
Stelmach et al., "Stereo Image Quality; Effects of Mixed Spatio-Temporal Resolution", IEEE Transactions on Circuits and Systems for Video Technology, vol. 10, No. 2 (Mar. 2000) pp. 188-193.
Stelmach et al., "Stereoscopic Image Coding: Effect of Disparate Image-Quality in Left- and Right-Eye Views", Signal Processing: Image Communication, vol. 14, (1998), pp. 111-117.
Tam et al., "Perceived Image Quality of MPEG-2 Stereoscopic Sequences", Human Vision and Electronic Imaging II, vol. 3016 (Jun. 3, 1997), pp. 296-301.
von Helmholtz, H., "Helmholtz's Treatise on Physiological Optics" (Southall, J., Trans.), Dover Publications, Inc. (1962), 768 pages.

(56) References Cited

OTHER PUBLICATIONS

Winkler, S., "Perceptual Video Quality Metrics—A Review", Digital Video Image Quality and Perceptual Coding, (Nov. 2005) pp. 155-179.

* cited by examiner

METHODS AND APPARATUSES RELATING TO THE HANDLING OF A PLURALITY OF CONTENT STREAMS

RELATED APPLICATION

This application was originally filed as PCT Application No. PCT/FI2016/050816 filed Nov. 21, 2016 which claims priority benefit from GB Patent Application No. 1522822.4 filed Dec. 23, 2015.

FIELD

This specification relates generally to the handling of a plurality of content streams.

BACKGROUND

In the field of audio/video recording, it is often necessary to handle relatively large quantities of data. In particular, when audio/video content is obtained from a number of recording devices, there is a need to handle even larger quantities of data. This brings new challenges in relation to managing the large quantities of data in a reliable, efficient and user-friendly manner.

SUMMARY

In a first aspect, this specification describes a method comprising selecting at least one content stream from a plurality of content streams based on at least one detected characteristic associated with the content streams or an intended viewer of the content streams, wherein each content stream is captured by a corresponding recording device and at least one of the plurality of content streams is not selected, and compressing data representing the at least one selected content stream such that the content of the at least one selected content stream has a lower quality compared to the content of the at least one non-selected content stream.

The method may further comprise causing at least one of transmission and storage of the data representing the at least one selected content stream and the data representing the at least one non-selected content stream.

The method may further comprise detecting a change in the at least one characteristic, making a new selection of at least one content stream from the plurality of content streams based on the detected change in the at least one characteristic, wherein at least one of the plurality of content streams is not selected in the new selection, and compressing the data representing the at least one newly selected content stream such that the content of the at least one newly selected content stream has a lower quality compared to the content of the at least one newly non-selected content stream.

The method may further comprise causing at least one of transmission and storage of the data representing the at least one newly selected content stream and the data representing the at least one newly non-selected content stream.

The transmitted data and/or the stored data may be used to generate asymmetric stereoscopic content.

The at least one detected characteristic may relate to at least one of: one or more characteristics of the content streams, one or more characteristics of the recording devices, and one or more characteristics of the intended viewer of the content streams.

The one or more characteristics of the content streams may comprise at least one of: an amount of high frequency components in each of the content streams, an amount of disparity in the each of the content streams, a measure of the presence of one or more regions of interest each of the content streams, and an amount of motion in each of the content streams.

The one or more characteristics of the recording devices may comprise at least one of: relative positions of each of the recording devices, pointing directions of each of the recording devices, spatial resolution recording capability of each of the recording devices, and temporal resolution recording capability of each of the recording devices.

The one or more characteristics of a user may comprise at least one of: user eye dominance and a user preference.

Selecting at least one content stream may comprise selecting one of a plurality of predetermined distributions of selected and non-selected content streams based on the at least one detected characteristic, each distribution defining at least one content stream to be selected and at least one content stream not to be selected, and causing at least one content stream to be selected according to the selected predetermined distribution.

The plurality of predetermined distributions may define a group of content streams to be selected and a group of content streams not to be selected.

The predetermined distributions may be defined such that each recording device corresponding to a content stream to be selected is adjacent to at least one recording device corresponding to a content stream not to be selected.

There may be eight content streams in total and the predetermined distributions may comprise a distribution in which 4 content streams are to be selected and 4 content streams are not to be selected, and a distribution in which 3 content streams are to be selected and 5 content streams are not to be selected.

The selected content data may be compressed by at least one of: low-pass filtering, downsampling, sample-domain quantization, and transform-domain quantization.

In a second aspect, this specification describes apparatus configured to perform any method as described with reference to the first aspect.

In a third aspect, this specification describes computer-readable instructions which, when executed by computing apparatus, cause the computing apparatus to perform any method described with reference to the first aspect.

In a fourth aspect, this specification describes apparatus comprising at least one processor and at least one memory including computer program code, which when executed by the at least one processor, causes the apparatus to select at least one content stream from a plurality of content streams based on at least one detected characteristic associated with the content streams or an intended viewer of the content streams, wherein each content stream is captured by a corresponding recording device and at least one of the plurality of content streams is not selected, and compress data representing the at least one selected content stream such that the content of the at least one selected content stream has a lower quality compared to the content of the at least one non-selected content stream.

The computer program code, when executed by the at least one processor, may cause the apparatus to cause at least one of transmission and storage of the data representing the at least one selected content stream and the data representing the at least one non-selected content stream.

The computer program code, when executed by the at least one processor, may cause the apparatus to detect a change in the at least one characteristic, make a new selection of at least one content stream from the plurality of content streams based on the detected change in the at least one characteristic, wherein at least one of the plurality of content streams is not selected in the new selection, and compress the data representing the at least one newly selected content stream such that the content of the at least one newly selected content stream has a lower quality compared to the content of the at least one newly non-selected content stream.

The computer program code, when executed by the at least one processor, may cause the apparatus to cause at least one of transmission and storage of the data representing the at least one newly selected content stream and the data representing the at least one newly non-selected content stream.

The transmitted data and/or the stored data may be used to generate asymmetric stereoscopic content.

The at least one detected characteristic may relate to at least one of: one or more characteristics of the content streams, one or more characteristics of the recording devices, and one or more characteristics of the intended viewer of the content streams.

The one or more characteristics of the content streams may comprise at least one of: an amount of high frequency components in each of the content streams, an amount of disparity in the each of the content streams, a measure of the presence of one or more regions of interest each of the content streams, and an amount of motion in each of the content streams.

The one or more characteristics of the recording devices may comprise at least one of: relative positions of each of the recording devices, pointing directions of each of the recording devices, spatial resolution recording capability of each of the recording devices, and temporal resolution recording capability of each of the recording devices.

The one or more characteristics of a user may comprise at least one of: user eye dominance and a user preference.

The computer program code, when executed by the at least one processor, may cause the apparatus to: select one of a plurality of predetermined distributions of selected and non-selected content streams based on the at least one detected characteristic, each distribution defining at least one content stream to be selected and at least one content stream not to be selected, and cause at least one content stream to be selected according to the selected predetermined distribution.

The plurality of predetermined distributions may define a group of content streams to be selected and a group of content streams not to be selected.

The predetermined distributions may be defined such that each recording device corresponding to a content stream to be selected is adjacent to at least one recording device corresponding to a content stream not to be selected.

There may be eight content streams in total and the predetermined distributions may comprise a distribution in which 4 content streams are to be selected and 4 content streams are not to be selected, and a distribution in which 3 content streams are to be selected and 5 content streams are not to be selected.

The selected content data may be compressed by at least one of: low-pass filtering, downsampling, sample-domain quantization, and transform-domain quantization.

In a fifth aspect, this specification describes a computer-readable medium having computer-readable code stored thereon, the computer readable code, when executed by at least one processor, cause performance of at least: selecting at least one content stream from a plurality of content streams based on at least one detected characteristic associated with the content streams or an intended viewer of the content streams, wherein each content stream is captured by a corresponding recording device and at least one of the plurality of content streams is not selected, and compressing data representing the at least one selected content stream such that the content of the at least one selected content stream has a lower quality compared to the content of the at least one non-selected content stream. The computer-readable code stored on the medium of the fifth aspect may further cause performance of any of the operations described with reference to the method of the first aspect.

In a sixth aspect, this specification describes apparatus comprising means for selecting at least one content stream from a plurality of content streams based on at least one detected characteristic associated with the content streams or an intended viewer of the content streams, wherein each content stream is captured by a corresponding recording device and at least one of the plurality of content streams is not selected, and means for compressing data representing the at least one selected content stream such that the content of the at least one selected content stream has a lower quality compared to the content of the at least one non-selected content stream. The apparatus of the sixth aspect may further comprise means for causing performance of any of the operations described with reference to the method of the first aspect.

BRIEF DESCRIPTION OF THE DRAWINGS

For a more complete understanding of the methods, apparatuses and computer-readable instructions described herein, reference is now made to the following descriptions taken in connection with the accompanying drawings in which.

DETAILED DESCRIPTION

Figure 1:
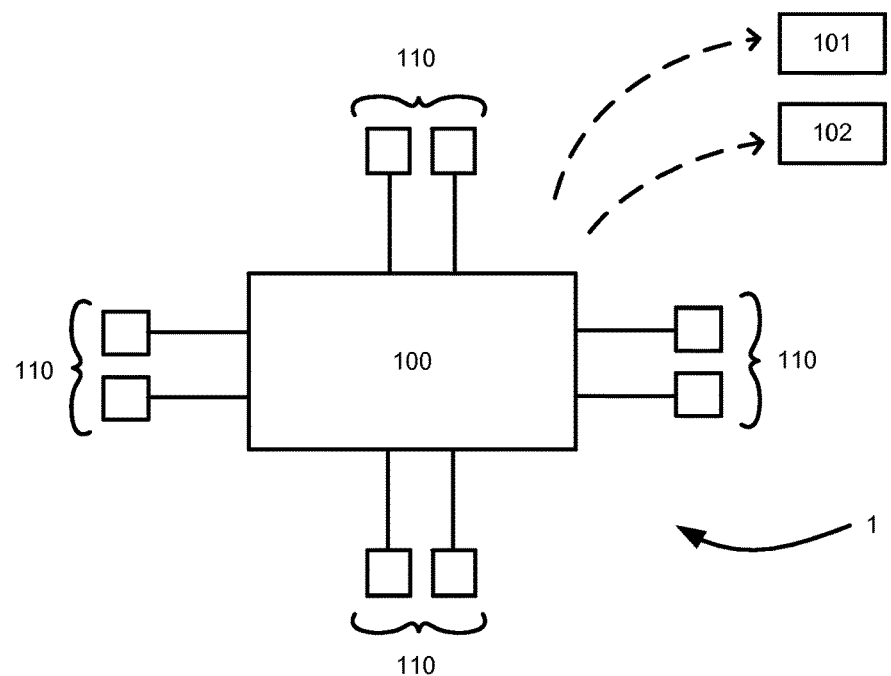
FIG. 1 is a block drawing of a recording apparatus including a content stream selection apparatus and a plurality of recording devices which can transmit data to various destinations.

In the description and drawings, like reference numerals may refer to like elements throughout.

FIG. 1 illustrates an example of a recording apparatus 1 for capturing content within an environment. The recording apparatus 1 may comprise a plurality of recording devices 110 and content stream selection and processing apparatus 100 (which may, for simplicity's sake, be referred to as "selection apparatus") for selecting content streams derived from one or more of the recording apparatus 1. Each of the recording devices 110 may comprise at least one camera and/or at least one microphone. The selection apparatus 100 may be further configured to control various other components of the recording apparatus 1. Alternatively, control of the other components of the recording apparatus may be provided by a separate control unit (not shown).

The selection apparatus 100, recording devices 110 and control unit (where applicable) may be provided in a single physical unit. In other examples, however, the selection apparatus 100 may be provided in separate physical unit to the unit(s) in which the recording devices 110 and control unit (where applicable) are provided. For instance, the recording devices 110 and control unit may take the form of a presence-capture device such as Nokia's OZO camera (which is similar to that illustrated in FIG. 2) and the selection apparatus may receive data captured by the presence-capture device via wired or wireless connection. In other examples, the selection apparatus 100 may be physically integrated with the presence-capture device. In other examples, the recording devices 110 may each be physically separable units which are communicatively coupled with a unit housing the selection apparatus 100.

The recording apparatus 1 may be configured to capture one or more content streams using the plurality of recording devices 110. The recording apparatus 1 may be further configured to store the one or more content streams. In addition or alternatively, recording apparatus 1 may be configured to transmit the one or more content streams to a playback/editing apparatus 101 for playback, editing and/or storage. In addition or alternatively, the recording apparatus 1 may be configured to transmit the one or more content streams to a remote server apparatus 102 for storage. The playback/editing apparatus 101 (which may be simply referred to as playback or replay apparatus) is configured to replay captured content for consumption by a viewer.

Each of the recording devices 110 may be configured to capture streams of video and/or audio content. Content stream as used herein may refer to a stream of visual data (e.g. video), a stream of audio data, and/or a stream of audio-visual (AV) data. However, for simplicity, the Figures will be discussed primarily with reference to video content streams. As such, in the following description, each of the recording devices may sometimes be referred to as a camera. It will however be appreciated that the concepts and principles described herein may equally apply to audio content and/or AV content streams. The recording devices 110 may be arranged such that the content stream captured by each of the recording devices 110 is associated with a different region of an environment. In other words, the recording devices 110 may be arranged such that each of the recording devices 110 has a different field of view within the environment. In some embodiments, the recording devices may be arranged to fully cover three hundred and sixty degrees of the surroundings of a presence-capture device. In other words, the presence-capture device may have a three hundred and sixty degree field of view.

Figure 2:
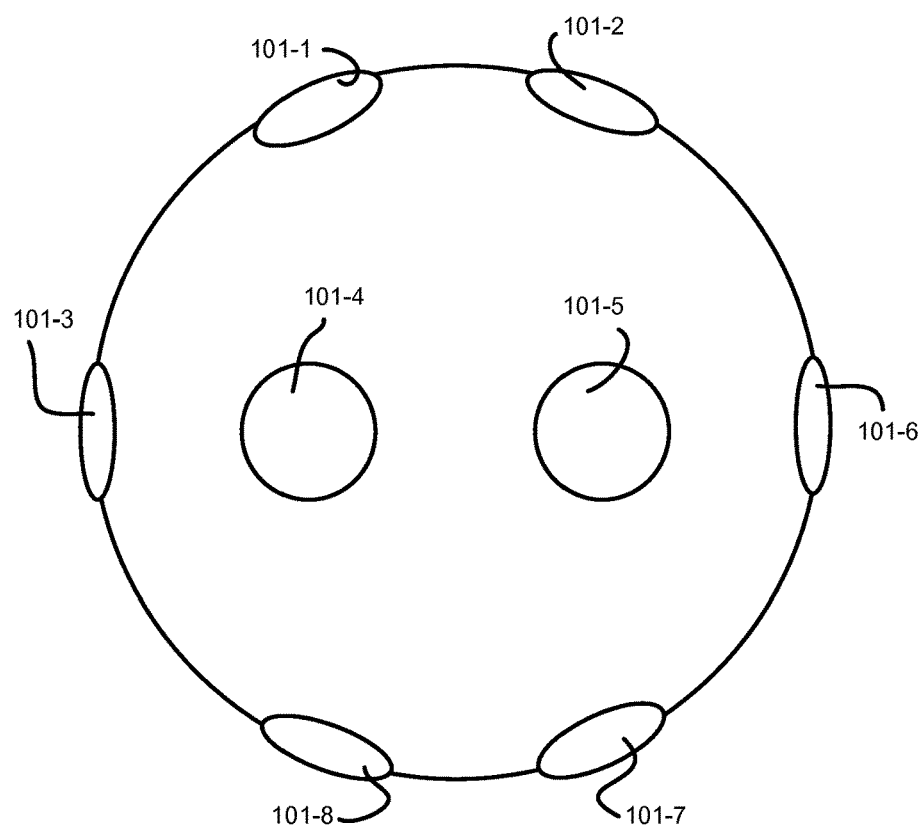
FIG. 2 illustrates an example of a presence-capture device which may be used to capture content streams.

FIG. 2 is an example of a recording apparatus 1 in the form of a presence-capture device. In the example of FIG. 2, the plural recording devices 101-1 to 101-8 are arranged in a 3D array. Specifically, in the example, the device comprises at least substantially upwardly-orientated recording device 101-1, 101-2, at least one substantially downwardly-orientated recording device 101-7, 101-8 at least one substantially leftward-orientated recording device 101-6, at least one substantially rightward-orientated recording device 101-3 and at least one substantially forwardly-orientated recording device 101-4, 101-5. The recording devices are, in this example, arranged in three planes: an upper plane including the upwardly-orientated recording device 101-1, 101-2, a middle plane including the substantially leftward, rightward and forward orientated recording devices and a lower plane including the substantially downward facing recording device 101-8, 101-7.

In the specific example of FIG. 2, the apparatus 1 includes a first to eighth recording devices 101-1 to 101-8. The first and second recording apparatus are located in the upper plane and which are substantially upwardly-orientated, the third to sixth recording devices are located in the middle plane, and the seventh and eight devices are locating in the lower plane and are substantially downwardly-orientated.

In general, video content can be used to generate stereoscopic video content. Typically, generating stereoscopic video content involves providing left eye video content and right eye video content to the left and right eyes of a viewer respectively. The left eye content and right eye content are offset from each other to create the illusion of 3D depth for a viewer. Referring to FIG. 1, video content streams captured by the recording devices 110 of the recording apparatus 1 may be used to generate stereoscopic video content. More specifically, a pair of video content streams captured by a corresponding pair of recording devices 110 may respectively be used as the left eye video content and right eye video content to generate stereoscopic video content.

However, in a recording apparatus with a plurality of recording devices 110, such as those illustrated by FIGS. 1 and 2, multiple recording devices may be capturing video content simultaneously. Therefore, the amount of data that needs to be dealt with may be relatively high if the captured video content streams are to be used to generate stereoscopic video content. The higher number of recording devices 110 covering different viewing angles enables the viewer to select the desired viewing point by switching between stereo pairs of recording devices 110. This allows the viewer to change the viewing direction as desired. Such increased number of recording devices 110 enables head mounted displays (HMDs) to be fed with enough broad viewing angles and enough views to switch between in order to give the user the sensation of being in the place where the content was captured. In other words, the content captured by the recording devices 110 may be used to generate a virtual reality environment for a viewer.

In stereoscopic videos two synchronized, monoscopic video streams are included and normally the left and the right views have similar quality, i.e., both views have the same spatial resolution and have been encoded similarly or identically. In some cases, such as in asymmetric stereoscopy, the quality of one view is intentionally degraded compared to the other one. This is attributed to the widely believed assumption of the binocular suppression theory that the human vision system (HVS) fuses the two images in such a way that the perceived quality is closer to that of the higher quality view. Therefore, one way to decrease the amount of required bitrate produced by several available recording devices is to generate asymmetric stereoscopic video content from the captured video content streams. In asymmetric stereoscopy, as described above, the content streams for presentation to the left and right eyes have different visual quality. In other words, either the content stream for the left eye has lower visual quality than the content stream for the right eye, or vice versa.

Visual quality may be determined by various image quality assessment methods (IQA). For example, visual quality may be determined based on objective quality assessment methods such as full-reference (FRef), reduced-reference (RRef), and no-reference quality assessment metrics. Any objective metric may be used to evaluate the quality of the content. The simplest and most popular IQA scheme is the mean squared error (MSE) and Peak-Signal-to-Noise (PSNR) (which is calculated based on MSE). MSE and PSNR are widely used due to the fact that they are simple to calculate, have clear physical meanings, and are mathematically easy to deal with. Other objective metrics include but are not limited to the following: Structural similarity index (SSIM), Video Quality Metric (VQM), PSNR Human Visual system Masking (PSNR-HVS-M), PSNR Human Visual System (PSNR-HVS), Visual Signal-to-Noise Ratio (VSNR), Weighted Signal-to-Noise Ratio (WSNR), Visual Information Fidelity (VIF), and Multi-Scale Structural Similarity Index (MS-SSIM). Visual quality may also be determined based on subjective quality assessment, which is based on subjective human judgement of the quality of images, for instance, the general quality of the video and/or the amount of depth perception for the stereoscopic content.

In asymmetric stereoscopy, the difference in visual quality between left and right eye content is typically generated by compressing video content for the left eye and right eye differently. Compressing in this context refers to data compression, which is the operation of reducing the number of bits used to represent a piece of information. Video compression can be achieved by removing one or more of spatial, frequency and temporal redundancies in video content, and is commonly used as part of video encoding processes. When a stream of data (e.g. a video content stream) is compressed, the bit-rate required to process/transmit the data stream is reduced as a consequence. Therefore, asymmetric stereoscopy provides a way of reducing the overall amount of data which needs to be dealt with, while trying to keep the subjective quality of the stereoscopic content intact.

Referring again to FIG. 1, the selection apparatus 100 is configured to select at least one content stream from the plurality of content streams based on at least one detected characteristic associated with the content streams or an intended viewer of the content streams, wherein each content stream is captured by a corresponding recording device 110 and at least one of the plurality of content streams is not selected. The selection apparatus 100 may be configured to monitor the at least one characteristic. The at least one characteristic may be a characteristic based on information received by the selection apparatus 100. The at least one characteristic may be a characteristic based on calculations and/or measurements made by the selection apparatus 100. The selection apparatus 100 is further configured to compress data representing the at least one selected content stream such that the content of the at least one selected content stream has a lower quality compared to the content of the at least one non-selected content stream. Lower quality in this context may mean lower visual quality. The selection apparatus 100 may be configured to achieve this by compressing data representing the at least one selected content stream such that the data representing the at least one selected content stream is more compressed than the data representing the at least one non-selected content stream. The non-selected content stream(s) may also be compressed by the selection apparatus 100, but is less compressed than the selected content stream(s). Alternatively, the non-selected content stream(s) may not be compressed at all. In this way, the overall amount of data representing the captured content streams is reduced due to further compression of the at least one selected content stream.

The selected content data may be compressed by at least one of: low-pass filtering, downsampling, sample-domain quantization, and transform-domain quantization. It will be appreciated that these techniques are not mutually exclusive and may be applied alone or in any combination. The data compression techniques used may be lossless compression techniques or lossy compression techniques.

The selected and non-selected content streams may be compressed according to mixed-resolution (MR) stereoscopic video coding, also referred to as resolution-asymmetric stereoscopic video coding. In this technique, the selected content stream is low-pass filtered and hence has a smaller amount of spatial detail or a lower spatial resolution. Furthermore, the low-pass filtered selected content stream may then be sampled with a coarser sampling grid so that it is represented by fewer pixels.

The selected content streams and non-selected content streams may be compressed according to mixed-resolution chroma sampling. In this technique, the chroma pictures of the selected content streams are represented by fewer samples than the chroma pictures of the non-selected content streams.

The selected and non-selected content streams may be compressed according to asymmetric sample-domain quantization. The sample values of the selected and non-selected content streams are quantized with a different step size. For example, the luma samples of the non-selected content streams may be represented with a first range (e.g. 0 to 255 (i.e. 8 bits per sample)) while the range may be scaled to a second, shorter range (e.g. 0 to 159) for the selected content streams. Due to fewer quantization steps, the selected content streams can be compressed with a higher ratio compared to the non-selected content streams. Different quantization step sizes may be used for luma and chroma samples. As a special case of asymmetric sample-domain quantization, bit-depth-asymmetric stereoscopic video may be applied when the number of quantization steps in each view matches a power of two.

The selected and non-selected content streams may be compressed according to asymmetric transform-domain quantization. In this technique, the Discrete Cosine Transform (DCT) coefficients of the selected and non-selected content streams are quantized with a different step size. In this technique, the selected content streams are compressed to have a lower fidelity and may be subject to a greater amount of visible coding artifacts, such as blocking and ringing.

The selected and non-selected content streams may be compressed to have difference temporal resolutions (i.e. different picture rate).

Although various examples of compression techniques have been described above, it will be appreciated that the compression is not limited to any one of these techniques and may involve any combination of the above described techniques. Furthermore, the compressing may in general involve any data compression technique applicable to the content streams or any combination of data compression techniques applicable to the content streams.

The selection apparatus 100 may be further configured to cause at least one of transmission and storage of the data representing the at least one selected content stream and the data representing the at least one non-selected content stream. The transmission to, for instance, the playback apparatus 101 or the server apparatus 102, may be wired transmission or wireless transmission. Since the overall amount of data representing the captured content streams has been reduced, the bit-rate and bandwidth required for transmission may be reduced. The amount of storage space required for storage may also be reduced.

The transmitted data and/or the stored data may be used to generate asymmetric stereoscopic content. To achieve this, data representing a selected content stream is used as either the content for the left eye or the content for the right eye, and data representing a non-selected content stream is used as the content for the other eye. In this way, one eye receives a content stream represented by more compressed data and the other eye receives a content stream represented by less compressed data. Thus, as explained above, the left and right eyes of a viewer are presented with content of different visual quality. However, in these circumstances, the human vision system exhibits a binocular suppression effect which allows a viewer to perceive the overall visual quality of the stereoscopic content as being close to that of the higher quality content. Therefore, even though the data representing the selected content stream has been more compressed compared to the data representing the non-selected content stream, a viewer perceives the generated stereoscopic content as being close to the visual quality of the non-selected (higher visual quality) content stream. As such, for any given desired visual quality of stereoscopic content, only one eye's content is required to be the desired quality. The other eye's content may be further compressed (reduced in quality) to some extent to reduce the overall amount of data which needs to be dealt with, without substantially changing the overall perceived quality of stereoscopic content.

The selection apparatus 100 may be further configured to detect a change in the at least one characteristic, for example, by monitoring the characteristic.

The selection apparatus 100 may be further configured to make a new selection of at least one content stream from the plurality of content streams based on the detected change in the at least one characteristic, wherein at least one of the plurality of content streams is not selected in the new selection. In this context, making a new selection refers to the operation of replacing the previous selection of which content streams are selected and which content stream are not selected with a new selection of which content streams are selected and which content streams are not selected. The operation of making a new selection based on the detected change in the at least one characteristic may be referred to as making a dynamic selection, since the selection apparatus 100 may dynamically change its selection depending on changes in the at least one characteristic.

The selection apparatus may be configured to compress the data representing the at least one newly selected content stream such that the content of the at least one newly selected content stream has a lower quality compared to the content of the at least one newly non-selected content stream. Lower quality in this context may mean lower visual quality. The selection apparatus 100 may be configured to achieve this by compressing the data representing the at least one newly selected content stream such that the data representing the at least one newly selected content stream is more compressed than the data representing the at least one newly non-selected content stream. The selection apparatus 100 may be further configured to cause at least one of transmission and storage of the data representing the at least one newly selected content stream and the data representing the at least one newly non-selected content stream. This transmitted and/or stored data may be used to generate asymmetric stereoscopic content. Therefore, by making a new selection, the selection apparatus 100 is able to alter which content streams may be used to generate asymmetric stereoscopic content, since any asymmetric stereoscopic content involves one selected content stream and one non-selected content stream. In this way, the selection apparatus 100 is able to dynamically respond to changes in the detected characteristic and make the most appropriate selection of content streams for the situation at hand.

The selection apparatus 100 may be further configured to select at least one content stream by selecting one of a plurality of predetermined distributions of selected and non-selected content streams based on the at least one detected characteristic, each distribution defining at least one content stream to be selected and at least one content stream not to be selected, and causing at least one content stream to be selected according to the selected predetermined distribution. In other words, rather than individually selecting content streams, the selecting of one or more content streams may be performed by selecting a predetermined distribution which defines which content streams are to be selected and which content streams are not to be selected. The selection of content streams is then made according to the selected predetermined distribution. For example, a predetermined distribution may define a group of content streams to be selected and a group of content streams not to be selected.

The selection apparatus 100 may have stored information regarding a plurality of predetermined distributions and select from the stored predetermined distributions. Examples of such predetermined distributions will be described in more detail below with reference to FIGS. 6A to 6D.

When selecting between predetermined distributions, the selection apparatus 100 may identify which predetermined distribution is most appropriate based on the current characteristics from at least some of the content streams. For instance, the characteristics of the group of non-selected content streams of each distribution may be compared with the characteristics of the group of non-selected content streams of the other distributions. The selection may then be made one the basis of the comparison. Alternatively, the characteristics of the selected content streams of each distribution may be compared with the characteristics of the selected content streams of the other distributions. For instance, an average of a particular characteristic for some or all of the non-selected (or selected) content streams may be calculated and compared with the average for the characteristic from the non-selected (or selected) contents streams from other distributions. In some examples, each content stream may be given a weighting (for instance, depending on its position or orientation) such that a weighted average is calculated. In this way, content streams which are considered "less important" may be given a lower weighting than content streams which are considered "more important". If we consider the example of FIG. 2, the recording devices on the middle plane 101-3, 101-4, 101-5, 101-6 may be given a higher weighting than those in the other two planes. The weighting method may differ based on the pre-defined preferences for a given recording apparatus. For example, some recording devices in one recording apparatus may be given a higher importance while the same (i.e. corresponding) recording devices in another recording apparatus may be given a lower importance. Such weighting can depend on user preference or the intended use for the recording apparatus, but is not limited as such.

The predetermined distributions may be defined such that each recording device 110 corresponding to a selected content stream is adjacent to at least one recording device 110 corresponding to a non-selected content stream. Adjacent may mean horizontally, vertically or diagonally adjacent. This may ensure that asymmetric stereoscopic content can be generated for as much of the environment in the field of view of the recording devices as possible. Vertical, horizontal and diagonal in this context refer to the relative locations of the recording devices. For instance, in the presence capture device illustrated in FIG. 2 in which the recording devices are provided substantially in three different planes, horizontally adjacent devices are those that are next to each other within the same plane, diagonally adjacent devices are adjacent devices in adjacent planes but which are not vertically aligned, and vertically adjacent devices are those which are in adjacent planes that are vertically aligned. In the context of FIG. 2, the term "adjacent" is used to mean adjacent across the front part of the presence-capture device, which is illustrated by FIG. 2. For instance, in FIG. 2, the third and fourth devices 101-3, 101-4 are horizontally adjacent as are the seventh and eighth devices 101-7, 101-8. The first and third devices 101-1, 101-3 are diagonally adjacent as are the second and sixth devices 101-2, 101-6, and the fourth and eighth devices 101-4, 101-8 are vertically adjacent as are the second and fifth devices 101-2, 101-5.

Assuming the configuration of recording devices shown in FIG. 2 in which there are eight recording devices corresponding to eight content streams in total, predetermined distributions in which each recording device 110 corresponding to a selected content stream is adjacent to at least one recording device 110 corresponding to a non-selected content stream which allow only horizontal and diagonal adjacency between selected and non-selected devices may comprise a distribution in which four content streams are to be selected and four content streams are not to be selected. Predetermined distributions in which each recording device 110 corresponding to a selected content stream is adjacent to at least one recording device 110 corresponding to a non-selected content stream which allow horizontal, diagonal and vertical adjacency between selected and non-selected devices may comprise a distribution in which three content streams are to be selected and five content streams are not to be selected. Examples of such predetermined distributions will be described in more detail below with reference to FIGS. 6A to 6D.

Although specific predetermined distributions have been described above, the predetermined distributions are not limited as such and may define any number of selected and non-selected content streams for any plural total number of content streams, as long as there is at least one selected content stream and at least one non-selected content stream.

The at least one detected characteristic may relate to at least one of: one or more characteristics of the content streams, one or more characteristics of the recording devices, and one or more characteristics of a user. The one or more characteristics of the content streams may comprise at least one of: an amount of high frequency components in each of the content streams, an amount of disparity in the each of the content streams, an amount of visible parts of one or more regions of interest each of the content streams, and an amount of motion in each of the content streams. The one or more characteristics of the recording devices may comprise at least one of: relative positions of each of the recording devices, pointing directions of each of the recording devices, spatial resolution recording capability of each of the recording devices, and temporal resolution recording capability e.g. frames per second (FPS) of each of the recording devices. The one or more characteristics of a user may comprise at least one of user eye dominance and user preference. The at least one detected characteristic may relate to any one of or any combination of the above-mentioned characteristics.

Each of the characteristics mentioned above is discussed in more detail below.

In examples in which the detected characteristic relates to an amount of high frequency components, the selection apparatus 100 may calculate the amount of high frequency components in each content stream (i.e. the amount of high frequency components in the data representing the content streams). The selection apparatus 100 may compare the calculated high frequency component amounts for each of the content streams to each other, and make a selection based on the comparison. For example, the selection apparatus 100 may select a content stream with the lowest amount of high frequency components. In another example, the selection apparatus 100 may only calculate the amount of high frequency components in some of the content streams. In other embodiments, the amount of high frequency components may be calculated only for some part of each content stream, e.g. a region of interest (ROI) in that stream. In other embodiments, the amount of high frequency components may be calculated in a block based approach. In this scenario, blocks which may or may not have the same size cover the surface of an image of a content stream and high frequency components may be calculated for each block separately. A median or average value of the high frequency components of the aforementioned blocks may be considered to represent the amount of high frequency components of that content stream. Based on the available resources and required accuracy/complexity, the size of the blocks may vary.

The selection apparatus 100 may calculate average values for the amount of high frequency components for various groups of content streams. The groups may be defined based on the allowed predetermined distributions (as discussed above). For instance, all non-selected content streams in the various distributions may be considered as separate group with the average values for each group being compared. In examples in which high frequency components are considered and in which the groups comprise the non-selected content streams of each predetermined distribution, the selected distribution might be that for which the group of content streams has the highest quantity of high frequency components. As mentioned above, different content streams within each group may be given a different weighting, such that weighted averages are compared.

In some examples, the high frequency components may be calculated in a block-based manner over whole images in the content stream using non-overlapping blocks that cover the whole of each image. Alternatively, the selection apparatus 100 may only calculate the amount of high frequency components in a part of each image (e.g. only some of the blocks).

In examples in which the detected characteristic relates to an amount of disparity in each of the content streams, the selection apparatus 100 may calculate the amount of disparity in each of the content streams, compare the calculated disparity amounts for each of the content streams to each other, and make a selection based on the comparison. The amount of disparity of each content stream may be calculated as the average or median of the disparities of all pixels in that content stream. Disparity may be a measure of the number of objects/regions close to the recording device (i.e. in the foreground) whose content stream is selected. For instance, content streams having lower disparities may be selected as this is an indication that these content streams have fewer objects in the foreground. These streams may be given a lower importance weight since it may be considered less important to have high visual quality in these streams.

Therefore these content streams may be selected as candidates for being further compressed compared to the other views.

In examples in which the detected characteristic relates to presence or absence of one or more regions of interest (or parts thereof) in each of the content streams, the selection apparatus 100 may calculate a measure of the presence of one or more regions of interest (or parts thereof) in each of the content streams. The calculated measure may then be compared for each of the content streams. Based on the comparison a selection may then be made. For example, a content stream having the lowest calculated measure of the presence of one or more regions of interest may be selected.

In examples in which the detected characteristic relates to the amount of motion in each of the content streams, the selection apparatus 100 may calculate the amount motion in each of the content streams, compare calculated amounts for each of the content streams to each other, and make a selection based on the comparison. For example, a content stream having the lowest amount of motion may be selected.

As with the number of high frequency components, the (weighted) averages of any of the disparity, motion and measures of regions of interest may be calculated for groups defined by the predetermined distributions. The selection of a particular pre-determined distribution of content streams may then be made on the basis of the comparison.

In examples in which the detected characteristic relates to relative positions of each of the recording devices 110, the selection apparatus 100 may select content streams corresponding to recording devices 110 which are positioned relative to each other in a particular predetermined arrangement. If the detected characteristic relates to pointing directions of each of the recording devices 110, the selection apparatus 100 may select content streams corresponding to recording devices 110 pointing in a particular direction.

In examples in which the detected characteristic relates to the spatial resolution recording capability of each of the recording devices 110, the selection apparatus 100 may select one or more content streams according to the spatial resolution recording ability of each of the recording devices 110. For example, the selection apparatus may select a content stream corresponding to a recording device 110 with the lowest spatial resolution recording ability.

In examples in which the detected characteristic relates to the temporal resolution recording capability (e.g. frames per second (FPS)) of each of the recording devices, the selection apparatus 100 may select one or more content streams according to the temporal resolution recording ability of each of the recording devices 110. For example, the selection apparatus 100 may select a content stream corresponding to a recording device 110 with the lowest temporal resolution recording ability.

In examples in which the detected characteristic relates to user eye dominance, the selection apparatus 100 may select content streams which are not to be provided to the dominant eye of a user. User eye dominance information may be input into the recording apparatus 1 or the playback apparatus (and communicated to the selection apparatus 100) by a user.

In examples in which the detected characteristic relates to user preference, the selection apparatus 100 may select content streams according to the user's preference/interest. For example, the user may share a list of interesting objects with the apparatus (e.g. an aeroplane, a dog etc.). Following this, the recording apparatus 1 may analyse the content in different views and if the selected objects of preference are visible in any of the content streams, those content streams may be categorized as non-selected content streams. Any object detection or pattern recognition algorithm may be used in this scenario to detect objects of interest in different streams. Such user preference may be communicated to the apparatus prior to presentation of the content.

Figure 3:
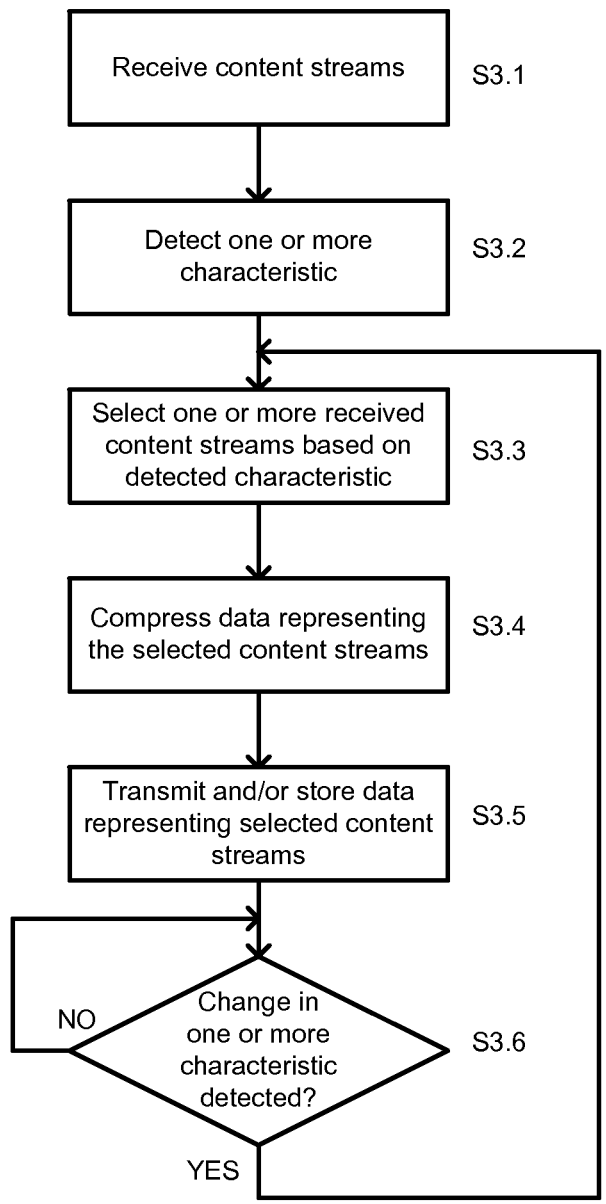
FIG. 3 is a flowchart illustrating examples of various operations performed by the content stream selection apparatus of FIG. 1

FIG. 3 is a flowchart showing examples of various operations which may be performed by the selection apparatus 100 of FIG. 1.

In operation S3.1, the selection apparatus 100 receives a content stream from each of the recording devices 110. In other words, the data representing the content streams captured by the recording devices 110 may be sent from the recording devices 110 to the selection apparatus 100.

In operation S3.2, the selection apparatus 100 detects one or more characteristics associated with the content streams or an intended viewer of the content streams. As mentioned above, this may be a characteristic of the content streams, a characteristic of the recording devices or may be a characteristic of a user viewing the content streams.

In operation S3.3, the selection apparatus 100 selects one or more of the received content streams based on the one or more detected characteristic. During selection, the selection apparatus 100 leaves at least one received content stream unselected. In other words, at least one received content stream is not selected by the selection apparatus 100.

In operation S3.4, after selecting one or more content streams, the selection apparatus 100 may compress data representing the at least one selected content stream such that the content of the at least one selected content stream has a lower quality compared to the content of the at least one non-selected content stream. This may be achieved by compressing the data representing the selected content streams such that the data representing selected content streams is more compressed than the data representing non-selected content streams. The selection apparatus 100 may also compress the data representing non-selected content streams. Compressing the data representing selected content streams more than the data representing non-selected content streams may be achieved by applying more data compression techniques or data compression operations to the data representing the selected content streams compared to the number of data compression techniques or data compression operations applied to the data representing the non-selected content streams.

In operation S3.5, following compression, the selection apparatus 100 may cause transmission and/or storage of the data representing the selected and non-selected content streams. If the data is transmitted, it may be transmitted to a playback/editing apparatus 101. If the data is stored, it may be stored at the recording apparatus 1 itself, at the content playback/editing apparatus 101 or at a remote server apparatus 102. In general, the data may be transmitted to any appropriate destination and/or stored at any appropriate storage medium. The transmitted data and/or the stored data representing the selected and non-selected content streams may then be used to generate asymmetric stereoscopic content.

At operation S3.6, the selection apparatus 100 may detect whether or not there is a change in the one or more characteristic. If a change is detected (YES), the selection apparatus 100 may make a new selection of one or more content streams based on the detected change in the at least one characteristic. As with above, at least one received content stream is not selected by the selection apparatus 100. Following a new selection, the same compressing and transmitting and/or storing operations described above may be applied the newly selected and non-selected content streams. As above, the newly selected and non-selected content streams may be used to generate asymmetric stereoscopic content. It will thus be understood that the selection apparatus 100 may continuously monitor the characteristic of interest and dynamically change the selection of the content streams accordingly.

If, in operation S3.6, a change is not detected (NO), the selection apparatus 100 may continue to monitor the one or more characteristic for any changes.

Various example predetermined distributions of content streams will now be discussed with reference to FIGS. 6A, 6B, 6C and 6D. The example predetermined distributions of FIGS. 6A to 6D may be used in the presence-capture device of FIG. 2, and are illustrated with respect to the presence-capture device of FIG. 2. In FIGS. 6A to 6D, recording devices corresponding to selected content streams are depicted as being filled with hashed lines and recording devices corresponding to non-selected content streams are depicted as being blank.

Figure 6A:
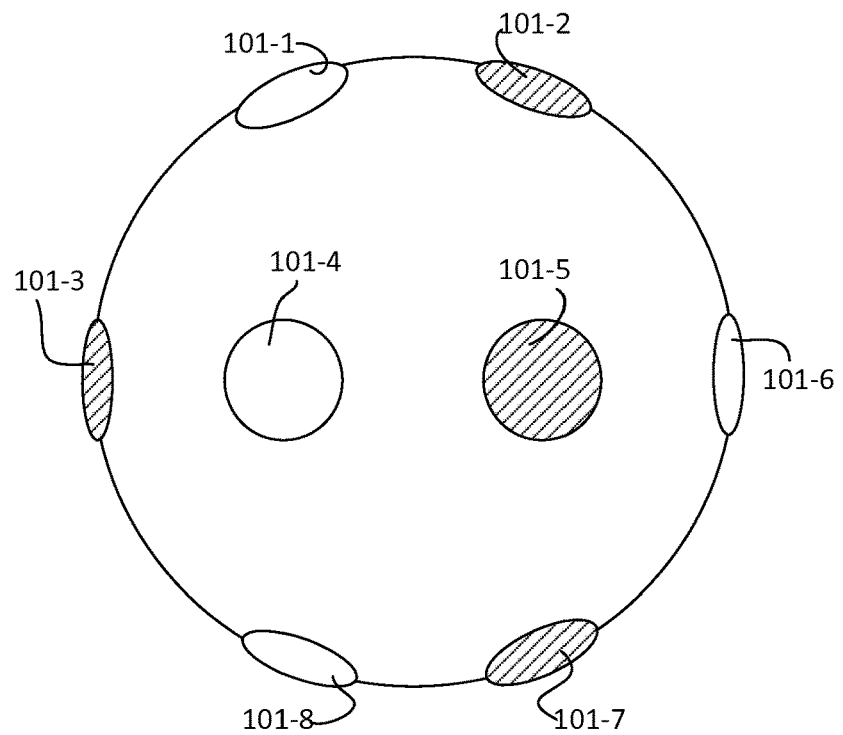
FIGS. 6A to 6D illustrate examples of predetermined distributions of selected and non-selected content streams.

In one example predetermined distribution illustrated by FIG. 6A, content streams corresponding to the second, third, fifth and seventh recording devices 101-2, 101-3, 101-5, 101-7 may be defined as a group of content streams to be selected, and content streams corresponding to the first, fourth, sixth and eighth recording devices 101-1, 101-4, 101-6, 101-8 may be defined as content streams not to be selected.

Figure 6B:
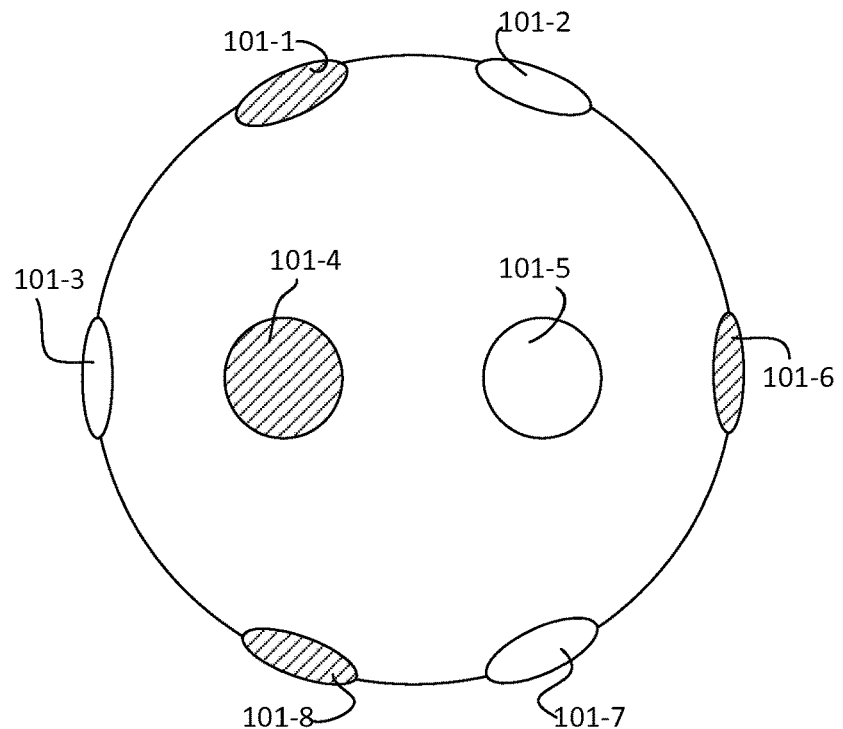

In an alternative predetermined distribution illustrated by FIG. 6B, content streams corresponding to the first, fourth, sixth and eighth recording devices 101-1, 101-4, 101-6, 101-8 may be defined as content streams to be selected and content streams corresponding to the second, third, fifth and seventh recording devices labelled 101-2, 101-3, 101-5 101-7 may be defined as content streams not to be selected.

Figure 6C:
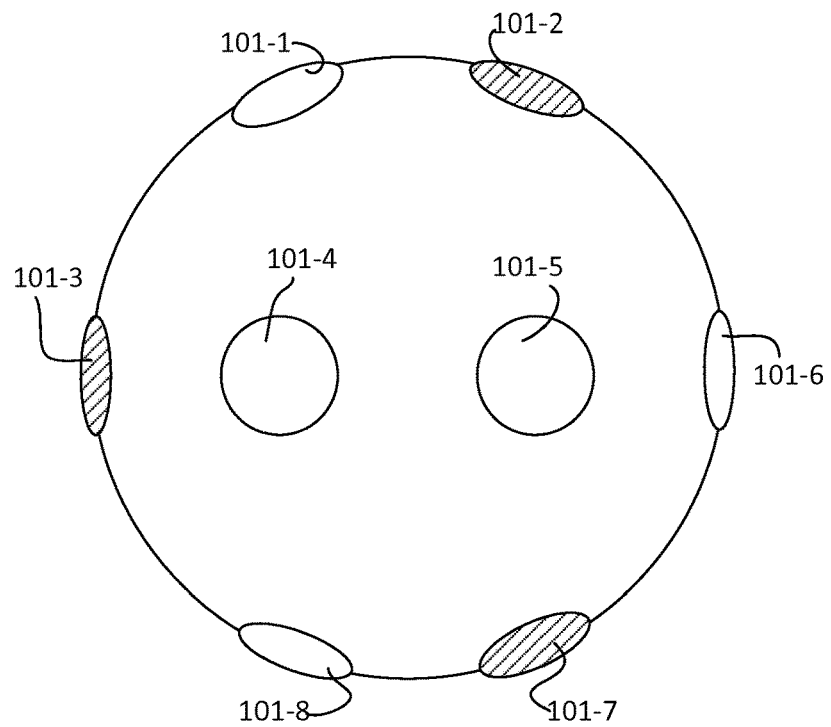

In another predetermined distribution illustrated by FIG. 6C, content streams corresponding to the second, third and seventh recording devices 101-2, 101-3, 101-7 may be defined as content streams to be selected and content streams corresponding to the first, fourth, fifth and sixth and eighth recording devices labelled 101-1, 101-4, 101-5 101-6, 101-8 may be defined as content streams not to be selected.

Figure 6D:
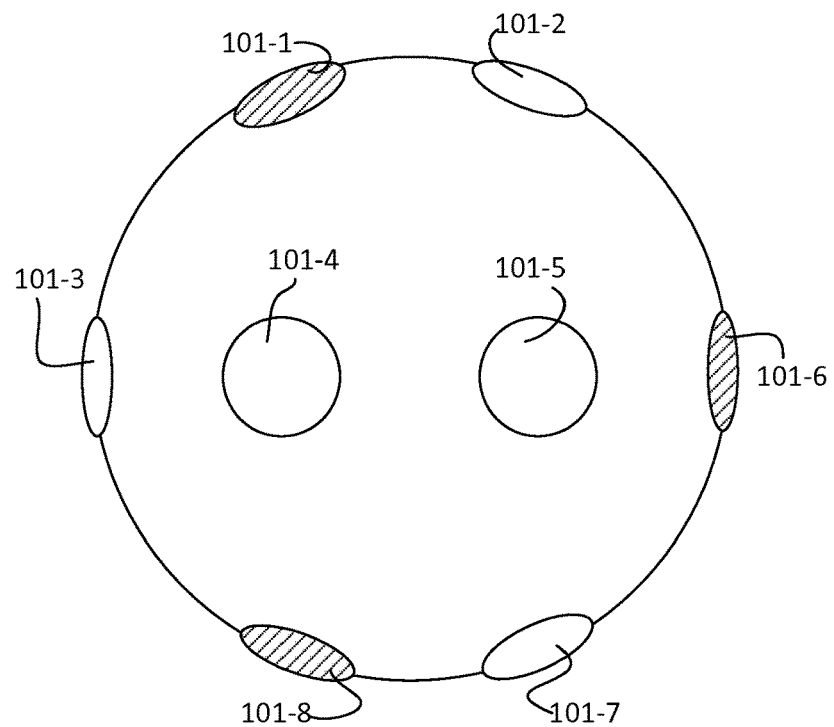

In another predetermined distribution illustrated by FIG. 6D, content streams corresponding to the first, sixth and eighth recording devices 101-1, 101-6, 101-8 may be defined as content streams to be selected and content streams corresponding to the second, third, fourth, fifth and seventh recording devices labelled 101-2, 101-3, 101-4 101-5, 101-7 may be defined as content streams not to be selected.

In the above predetermined distributions, each recording device corresponding to a selected content stream is adjacent to a recording device corresponding to a non-selected content stream. As discussed previously, adjacent may mean horizontally, vertically or diagonally adjacent. This may ensure that asymmetric stereoscopic content can be generated for as much of the environment in the field of view array of recording devices.

Although example specific predetermined distributions have been described above, the predetermined distributions are not limited as such and may define any number of selected and non-selected content streams for any plural total number of content streams, as long as there is at least one selected content stream and at least one non-selected content stream.

Figure 4:
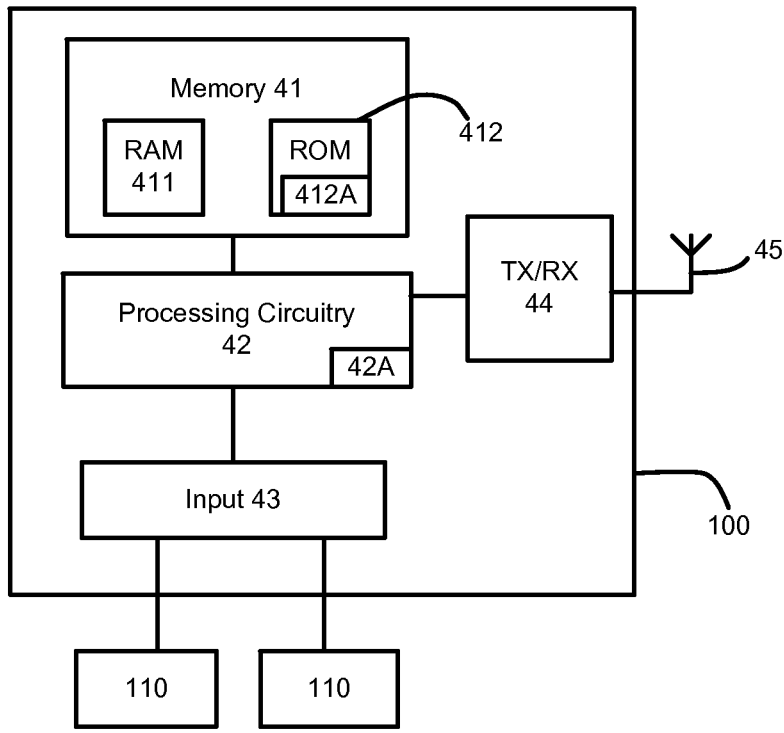
FIG. 4 is a schematic diagram of an example configuration of the content stream selection apparatus of FIG. 1.

FIG. 4 is a schematic block diagram of the selection apparatus 100. The selection apparatus 100 may comprise memory 41, processing circuitry 42, an input 43, a transmitter/receiver 44 and an antenna 45. The memory 41 may comprise read-only memory 412 (ROM) and random access memory 411 (RAM). The processing circuitry 42 may be configured to process data to carry out the operations of the selection apparatus 100 described above. The input 43 may receive content streams from a plurality of recording devices 110. The transmitter/receiver 44 may transmit, via the antenna 45, the above described data representing the content streams to a desired destination.

Figure 5:
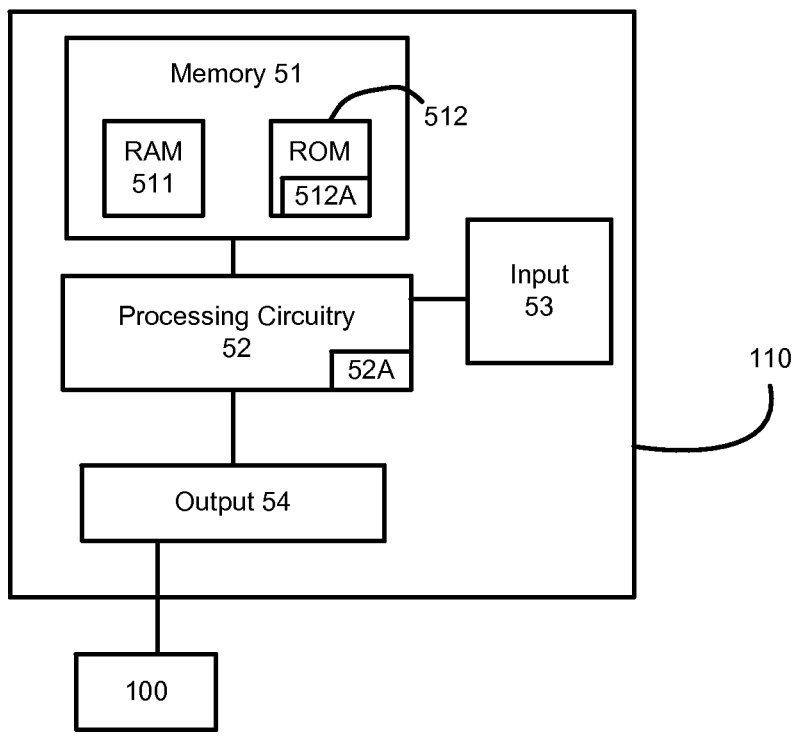
FIG. 5 is a schematic diagram of an example configuration of one of the recording devices of FIG. 1.

FIG. 5 is a schematic block diagram of a recording device 110. The recording device 110 may comprise memory 51, processing circuitry 52, an input 53 and an output 54. The memory 51 may comprise read-only memory 512 (ROM) and random access memory 511 (RAM). The input 53 may be configured to receive audio and/or visual content (i.e. sound and/or light) which is converted into electrical signals (i.e. data) by the processing circuitry 52. In examples in which the input 53 comprises a camera, it may of course comprise the necessary optical components (lenses etc.) and the necessary sensors (e.g. CCD). The output 54 may be configured to send the data representing the content to the selection apparatus 100.

The memory 41, 51 described with reference to FIGS. 4 and 5 has computer readable instructions 412A, 512A stored thereon, which when executed by the processing circuitry 42, 52 causes the processing circuitry 42, 52 to cause performance of various ones of the operations described above. The processing circuitry 42, 52 described above with reference to FIGS. 4 and 5 may be of any suitable composition and may include one or more processors 42A, 52A of any suitable type or suitable combination of types. For example, the processing circuitry 42, 52 may be a programmable processor that interprets computer program instructions and processes data. The processing circuitry 42, 52 may include plural programmable processors. Alternatively, the processing circuitry 42, 52 may be, for example, programmable hardware with embedded firmware. The processing circuitry 42, 52 may be termed processing means. The processing circuitry 42, 52 may alternatively or additionally include one or more Application Specific Integrated Circuits (ASICs). In some instances, processing circuitry 42, 52 may be referred to as computing apparatus.

The processing circuitry 42, 52 described with reference to FIGS. 4 and 5 is coupled to the respective memory 41, 51 (or one or more storage devices) and is operable to read/write data to/from the memory 41, 51. The memory 41, 51 may comprise a single memory unit or a plurality of memory units 411, 412, 511, 512, upon which the computer readable instructions 412A, 512A (or code) is stored. For example, the memory 41, 51 may comprise both volatile memory 511 and non-volatile memory 512. For example, the computer readable instructions 412A, 512A may be stored in the non-volatile memory 412, 512 and may be executed by the processing circuitry 42, 52 using the volatile memory 411, 511 for temporary storage of data or data and instructions. Examples of volatile memory include RAM, DRAM, and SDRAM etc. Examples of non-volatile memory include ROM, PROM, EEPROM, flash memory, optical storage, magnetic storage, etc. The memories 41, 51 in general may be referred to as non-transitory computer readable memory media.

The term 'memory', in addition to covering memory comprising both non-volatile memory and volatile memory, may also cover one or more volatile memories only, one or more non-volatile memories only, or one or more volatile memories and one or more non-volatile memories.

The computer readable instructions 412A, 512A described herein with reference to FIGS. 4 and 5 may be pre-programmed into the recording apparatus 1. Alternatively, the computer readable instructions 412A, 512A may arrive at the recording apparatus 1 via an electromagnetic carrier signal or may be copied from a physical entity such as a computer program product, a memory device or a record medium such as a CD-ROM or DVD. The computer readable instructions 412A, 512A may provide the logic and routines that enables the recording apparatus 1 to perform the functionality described above. The combination of computer-readable instructions stored on memory (of any of the types described above) may be referred to as a computer program product.

As will be appreciated, the recording apparatus 1 described herein may include various hardware components which have may not been shown in the Figures since they may not have direct interaction with embodiments of the invention.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term 'circuitry' refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

If desired, the different functions discussed herein may be performed in a different order and/or concurrently with each other. Furthermore, if desired, one or more of the above-described functions may be optional or may be combined. Similarly, it will also be appreciated that the flow diagram of FIG. 3 is an example only and that various operations depicted therein may be omitted, reordered and/or combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. A method, comprising:
   selecting a first distribution of a plurality of predetermined distributions based on at least one detected characteristic, wherein a respective distribution of the plurality of predetermined distributions defines at least one content stream to be selected and at least one content stream not to be selected, wherein the respective distribution defines a plurality of viewing angles and a plurality of viewing planes;
   selecting at least one content stream from a plurality of content streams of the first distribution, wherein the selection of the at least one content stream is based on the at least one detected characteristic associated with the plurality of content streams or an intended viewer of the plurality of content streams, wherein a respective content stream is captured by a respective recording device of a plurality of recording devices, and wherein at least one other content stream of the plurality of content streams of the first distribution is not selected; and
   compressing data representing the at least one selected content stream such that content of the at least one selected content stream has a lower quality compared to content of the at least one non-selected content stream.

2. The method according to claim 1, further comprising:
   causing at least one of transmission or storage of the data representing the at least one selected content stream and the data representing the at least one non-selected content stream.

3. The method according to claim 1, further comprising:
   detecting a change in the at least one characteristic;
   making a new selection of at least one content stream from the plurality of content streams based on the detected change in the at least one characteristic, wherein at least one of the plurality of content streams is not selected in the new selection; and
   compressing data representing the at least one newly selected content stream such that content of the at least one newly selected content stream has a lower quality compared to content of the at least one newly non-selected content stream.

4. The method according to claim 3, further comprising:
   causing at least one of transmission or storage of the data representing the at least one newly selected content stream and the data representing the at least one newly non-selected content stream.

5. The method according to claim 2, wherein at least one of the transmitted data or the stored data is used to generate asymmetric stereoscopic content.

6. An apparatus comprising:
at least one processor; and
at least one memory including computer program code, which when executed by the at least one processor, causes the apparatus to:
select a first distribution of a plurality of predetermined distributions based on at least one detected characteristic, wherein a respective distribution of the plurality of predetermined distributions defines at least one content stream to be selected and at least one content stream not to be selected, wherein the respective distribution defines a plurality of viewing angles and a plurality of viewing planes;
select at least one content stream from a plurality of content streams of the first distribution, wherein the selection of the at least one content stream is based on the at least one detected characteristic associated with the plurality of content streams or an intended viewer of the plurality of content streams, wherein a respective content stream is captured by a respective recording device of a plurality of recording devices, and wherein at least one other content stream of the plurality of content streams of the first distribution is not selected; and
compress data representing the at least one selected content stream such that content of the at least one selected content stream has a lower quality compared to content of the at least one non-selected content stream.

7. The apparatus according to claim 6, wherein the computer program code, when executed by the at least one processor, causes the apparatus to:
cause at least one of transmission or storage of the data representing the at least one selected content stream and the data representing the at least one non-selected content stream.

8. The apparatus according to claim 6, wherein the computer program code, when executed by the at least one processor, causes the apparatus to:
detect a change in the at least one characteristic; make a new selection of at least one content stream from the plurality of content streams based on the detected change in the at least one characteristic, wherein at least one of the plurality of content streams is not selected in the new selection; and
compress data representing the at least one newly selected content stream such that content of the at least one newly selected content stream has a lower quality compared to content of the at least one newly non-selected content stream.

9. The apparatus according to claim 8, wherein the computer program code, when executed by the at least one processor, causes the apparatus to:
cause at least one of transmission or storage of the data representing the at least one newly selected content stream and the data representing the at least one newly non-selected content stream.

10. The apparatus according to claim 7, wherein at least one of the transmitted data or the stored data is used to generate asymmetric stereoscopic content.

11. The apparatus according to claim 6, wherein the at least one detected characteristic relates to at least one of: one or more characteristics of the respective content stream; one or more characteristics of the respective recording device; and one or more characteristics of the intended viewer of the respective content stream.

12. The apparatus according to claim 11, wherein the one or more characteristics of the respective content stream comprise at least one of: an amount of high frequency components in the respective content stream; an amount of disparity in the respective content stream; a measure of presence of one or more regions of interest in the respective content stream; and an amount of motion in the respective content stream.

13. The apparatus according to claim 11, wherein the one or more characteristics of the respective recording device comprise at least one of: relative positions of the respective recording device; pointing directions of the respective recording device; spatial resolution recording capability of the respective recording device; and temporal resolution recording capability of the respective recording device.

14. The apparatus according to claim 11, wherein the one or more characteristics of a user comprise at least one of: user eye dominance; and a user preference.

15. The apparatus according to claim 6, wherein the computer program code, when executed by the at least one processor, causes the apparatus to:
cause at least one content stream to be selected according to the distribution.

16. The apparatus according to claim 15, wherein a respective distribution of the plurality of predetermined distributions defines a group of content streams to be selected and a group of content streams not to be selected.

17. The apparatus according to claim 15, wherein the plurality of predetermined distributions are defined such that the respective recording device corresponding to a content stream to be selected is adjacent to at least one recording device corresponding to a content stream not to be selected.

18. The apparatus according to claim 15, wherein there are eight content streams in total and the plurality of predetermined distributions comprise: a particular distribution in which 4 content streams are to be selected and 4 content streams are not to be selected; and another particular distribution in which 3 content streams are to be selected and 5 content streams are not to be selected.

19. The apparatus according to claim 6, wherein the selected content stream is compressed by at least one of: low-pass filtering; downsampling; sample-domain quantization; and transform-domain quantization.

20. A computer-readable medium having computer-readable code stored thereon, the computer-readable code, when executed by at least one processor, cause performance of at least:
selecting a first distribution of a plurality of predetermined distributions based on at least one detected characteristic, wherein a respective distribution of the plurality of predetermined distributions defines at least one content stream to be selected and at least one content stream not to be selected, wherein the respective distribution defines a plurality of viewing angles and a plurality of viewing planes;
selecting at least one content stream from a plurality of content streams of the first distribution, wherein the selection of the at least one content stream is based on the at least one detected characteristic associated with the plurality of content streams or an intended viewer of the plurality of content streams, wherein a respective content stream is captured by a respective recording device of a plurality of recording devices, and wherein at least one other content stream of the plurality of content streams of the first distribution is not selected; and compressing data representing the at least one selected content stream such that content of the at least one selected content stream has a lower quality compared to content of the at least one non-selected content stream.

* * * * *